United States Patent [19]

Raynes

[11] Patent Number: 5,366,050
[45] Date of Patent: Nov. 22, 1994

[54] BRAILLE INSERT IN A CONTINUOUS CARTRIDGE FOR HANDRAILS

[76] Inventor: Coco Raynes, 11-13 Remington St., Cambridge, Mass. 02138

[21] Appl. No.: 32,351

[22] Filed: Mar. 15, 1993

Related U.S. Application Data

[63] Continuation-in-part of Ser. No. 5,088, Feb. 23, 1993.

[51] Int. Cl.5 .................................... G09B 1/00
[52] U.S. Cl. ...................................... 182/18; 182/230; 434/113
[58] Field of Search .................. 182/18, 113, 230; 52/38, 105; 256/59; 248/225.1; 434/113

[56] References Cited

U.S. PATENT DOCUMENTS

| | | | |
|---|---|---|---|
| 1,902,769 | 3/1933 | Esdorn | 52/38 X |
| 2,679,998 | 6/1954 | Keller | 248/205.3 |
| 2,755,576 | 7/1956 | Golden | 248/205.3 |
| 3,918,686 | 11/1975 | Knott et al. | 256/59 |
| 5,065,837 | 11/1991 | Szudy | 182/18 |

Primary Examiner—Alvin C. Chin-Shue
Attorney, Agent, or Firm—Lahive & Cockfield

[57] ABSTRACT

A continuous polyvinyl chloride cartridge is insertable in a handrail groove, or adhered to it. A series of inserts bearing braille messages are insertable into, and are captured by, a groove in the cartridge. The cartridge is configured to have edges that are continuous with the braille inserts. The braille inserts have front and rear tapered surfaces to smoothly meet the back wall of the cartridge groove.

4 Claims, 4 Drawing Sheets

BRAILLE INSERT IN A CONTINUOUS CARTRIDGE FOR HANDRAILS

This application is a continuation-in-part of design patent application Ser. No. 29/005,088, filed Feb. 23, 1993.

BACKGROUND OF THE INVENTION

The invention relates generally to handrails with braille messages for the blind, and particularly to a continuous cartridge for mounting such braille messages on the handrails.

In a previous application filed by the inventor, Ser. No. 07/942,302, filed Sep. 9, 1992, U.S. Pat. No. 5,284,444, issued Feb. 8, 1994, there was set forth a system of handrails for use in buildings that included a series of braille messages imprinted on the inside of handrails. The handrail carries braille messages that describe a corridor pattern, announces ramps, stairs and offices, and summarizes an entire floor plan.

Providing the braille messages on the handrails requires consideration of the tactile needs of the blind person reading the messages and of the mechanical problems of mounting the braille messages on new or existing handrails. It is therefore an object of the invention to provide a system for effectively adding braille messages to new or existing handrails.

SUMMARY OF THE INVENTION

The invention provides a continuous cartridge insertable into a handrail groove, the cartridge itself providing a groove for insertion of one or more braille inserts. The cartridge is configured to have edges that are continuous with the braille inserts. The handrail groove terminates in an overhanging portion to hold the cartridge, and the cartridge groove terminates in an overhanging portion to capture the braille inserts. The back of the cartridge has a recessed surface to accommodate a two-sided tape for application to flat handrail surfaces.

DESCRIPTION OF THE DRAWINGS

Other objects, features and advantages of the invention will be described in, or will be apparent from, the following description of a preferred embodiment of the invention, including the drawings thereof, of which.

DESCRIPTION OF A PREFERRED EMBODIMENT

Figure 1:
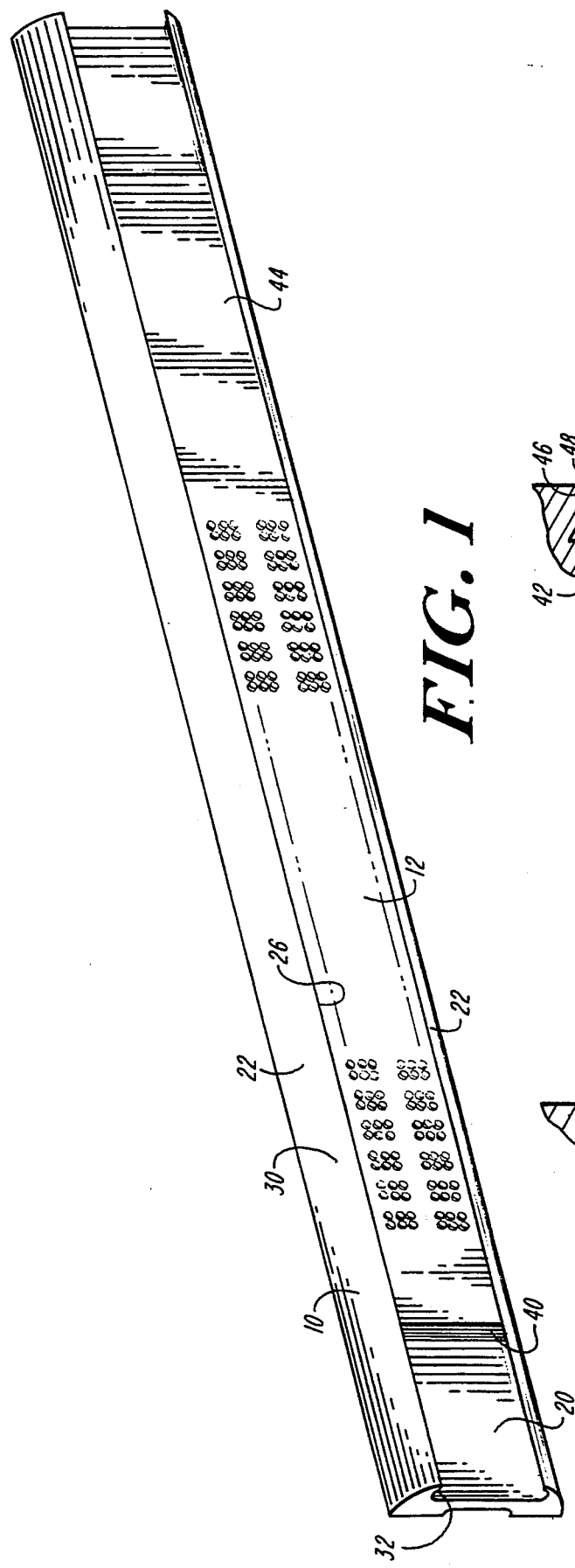
FIG. 1 is a perspective view of a braille insert in a continuous cartridge.
Figure 6:
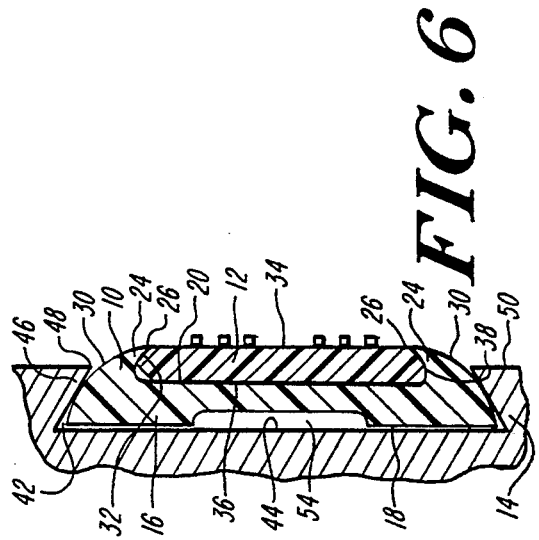
FIG. 6 is a cross sectional view of the cartridge and braille insert in a handrail.
Figure 7:
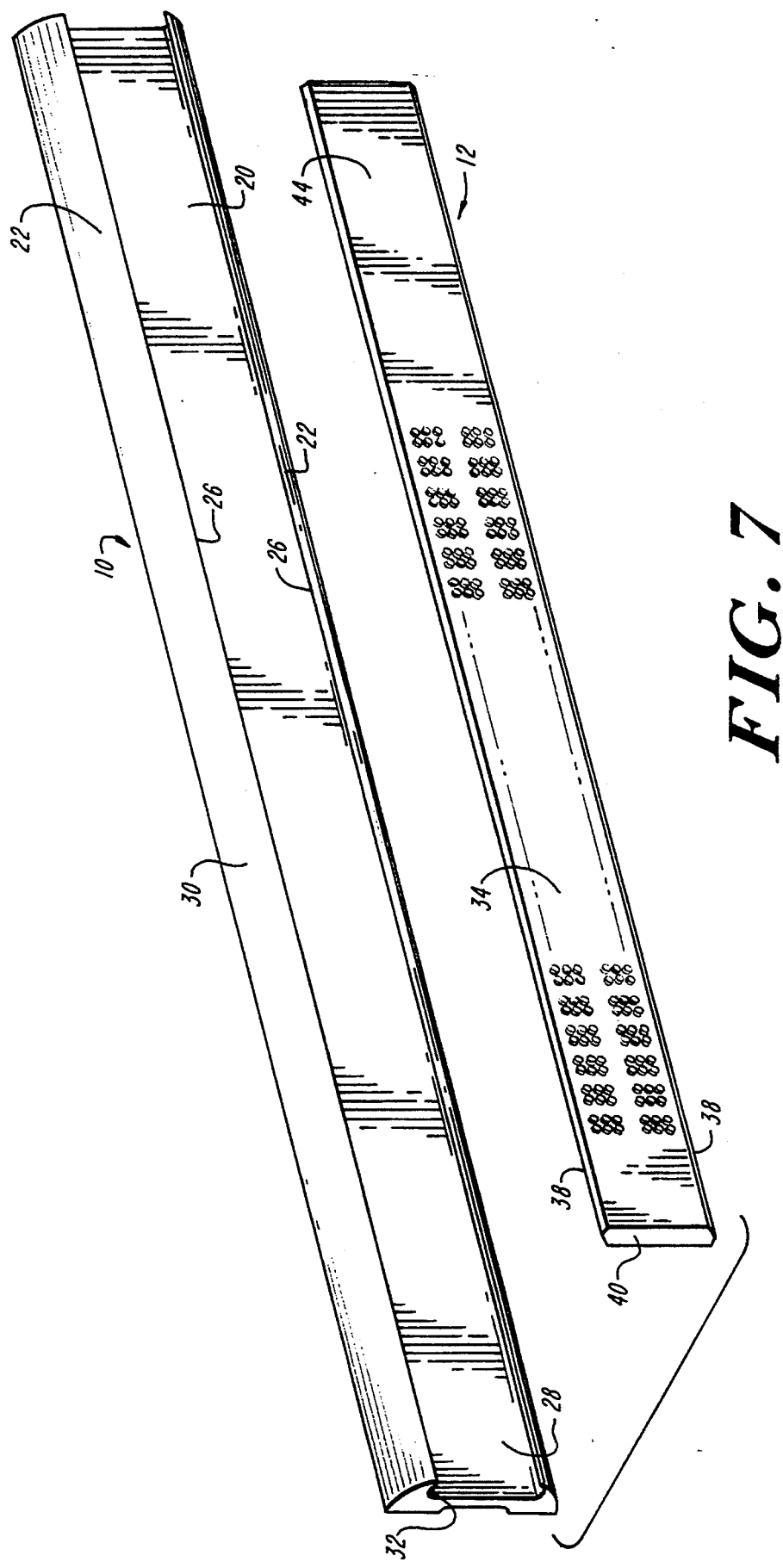
FIG. 7 is a perspective view, showing the braille insert separated from the continuous cartridge.
Figure 8:
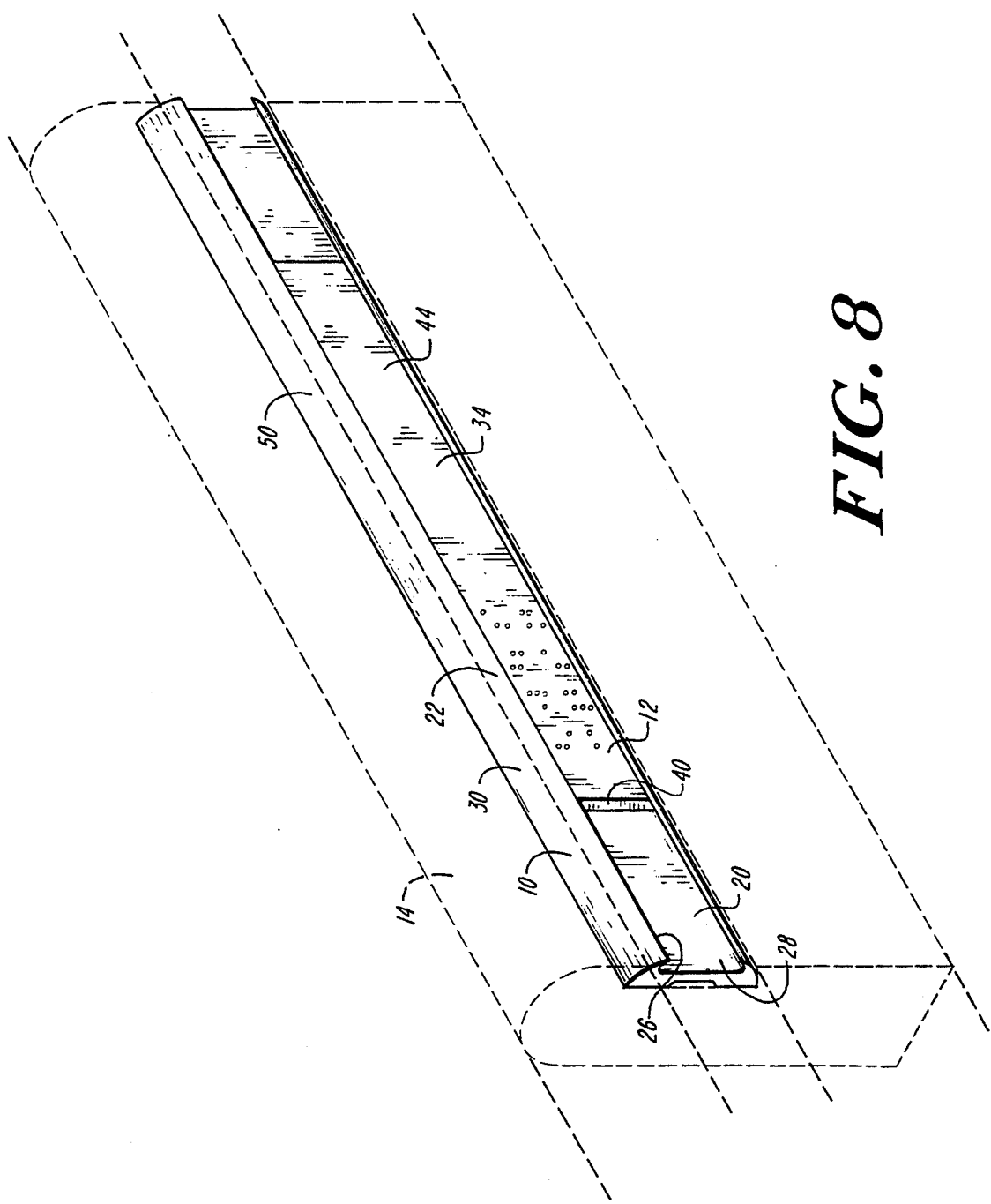
FIG. 8 is a perspective view, showing the insert and cartridge inserted in a groove in a handrail, shown in dotted lines.

As shown in FIG. 1, the cartridge 10 consists of a continuous piece, preferably made of polyvinyl chloride (PVC), and extruded so that fairly long sections of cartridges can be made. The material is soft and flexible enough so that it can be rolled and easily transported to a site where it is to be mounted or inserted. At the time of installation, the continuous cartridge 10 can be cut to an appropriate length. FIGS. 2, 3, 4 and 5 are different views showing braille inserts 12 mounted in the cartridge 10. FIG. 6 is a cross-sectional view showing how the braille insert 12 is inserted in the cartridge 10 and the cartridge 10 inserted in a handrail 14. FIG. 7 shows a braille strip 12 separated from the cartridge 10. FIG. 8 shows the cartridge 10, and braille strip 12, inserted in a wooden handrail 14 shown in dotted lines.

The cartridge 10, in cross-section (see FIG. 6), has a back portion 16 consisting of a generally planar back wall 18 and a parallel cartridge wall 20. Top and bottom portions 22 of the cartridge consist of forwarding extending gripping portions 24 that terminate at edges 26 overhanging, and spaced from, the cartridge wall of 20 the cartridge's back portion 16. A cartridge groove 28 is thereby formed, that is wider at the cartridge wall 20 in the back than it is at the front overhanging portion edges 26.

The forwardly extending gripping portions 24 have outside convex surfaces 30 that are curved, and inside curved concave surfaces 32. The tangents of the outside convex surfaces 24 at the edges 26 are approximately parallel to the cartridge wall 20.

A braille insert 12 (see FIG. 7) is a generally planar piece, typically 12 or 18 inches long. It has parallel front 34 and back 36 walls, and top and bottom surfaces that taper to top and bottom edges 38 slightly further apart than are the edges 22 of the cartridge 10. Each braille insert 12 has forward and rear tapered edges 40 that taper down from the front wall 34 of the braille insert 12 to the cartridge wall 20.

Usually the braille portion 42 of the braille insert 12 is located at one end of the insert 12, so that a flat portion 44 of the braille insert front surface 34 is a signal to the user that the braille messages 42 have terminated. The user can then run his or her fingers back over the braille message 42 to read it, since the braille reader is using his or her right hand to read the message, the braille message is on the inside of the handrail 14 and braille is read from left to right.

In a continuous cartridge 10, several braille inserts 12 would be typically inserted, spaced apart as needed, to inform the user of his or her location, of other locations of interest, or of obstacles such as ramps or turns, The tapered front and back edges 40 of the braille inserts 12 allow the user's fingers to smoothly move up to and down from the braille insert 12 to the cartridge wall 20, where the user's fingers can move comfortably in the cartridge groove 28 until the next braille strip 12 is encountered.

As shown in FIGS. 6 and 8, a typical installation involves a handrail 14 in which a handrail groove 42 has been formed which is similar to the cartridge groove 28. That is, it has a rear wall 44 and forwardly extending overhanging portions 46 with edges 48 that are spaced apart less than the width of the rear wall 44. The cartridge 10 is either bent into, or slides into, the handrail groove 42, which may be routed or machined or cast into the handrail 14, depending on the handrail material. The effect is that the fingers of a user move smoothly from a handrail inner surface 50 to the surfaces 30 of the cartridge 10 and from the surfaces 30 of the cartridge 10 to the surface 34 of the braille insert 12. The edges 26 of the cartridge 10 are closely adjacent the surface 34 of the braille insert 12 to make the transition smooth.

Figure 6A:
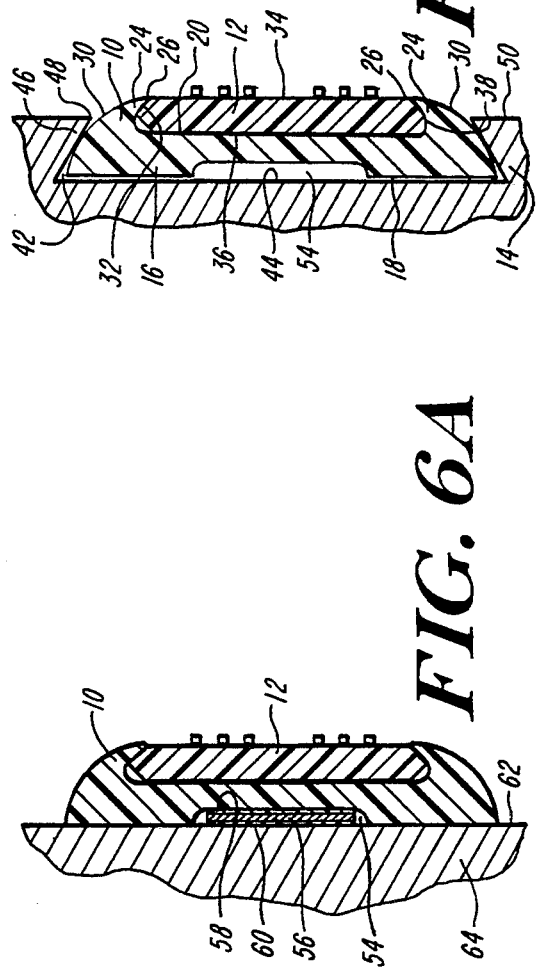
FIG. 6A illustrates an alternative embodiment.
Figure 2:
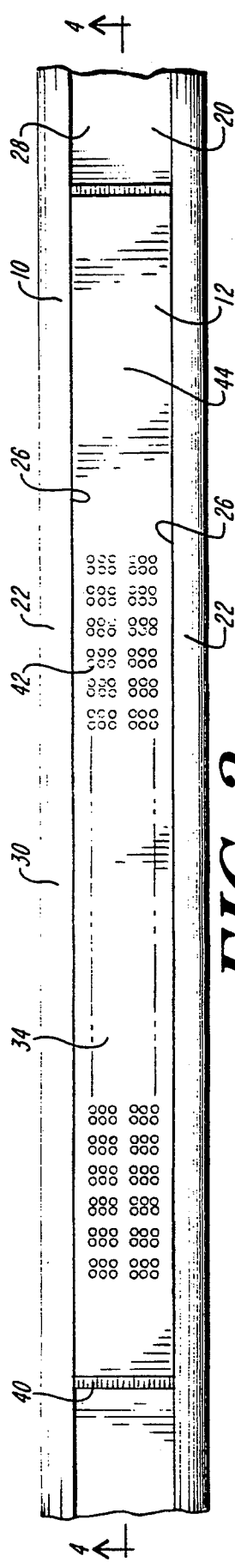
FIG. 2 is a front elevational view of the insert in the cartridge.
Figure 3:
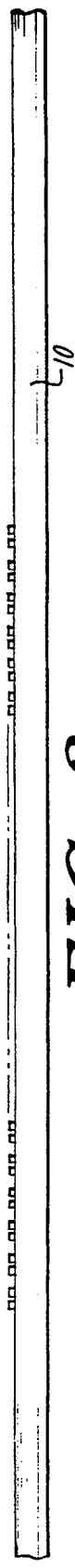
FIG. 3 is a top plan view of the insert in the cartridge.
Figure 4:
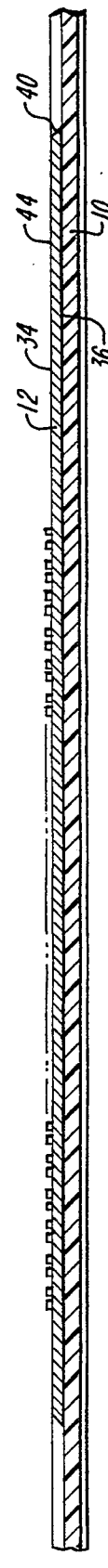
FIG. 4 is a sectional view.
Figure 5:
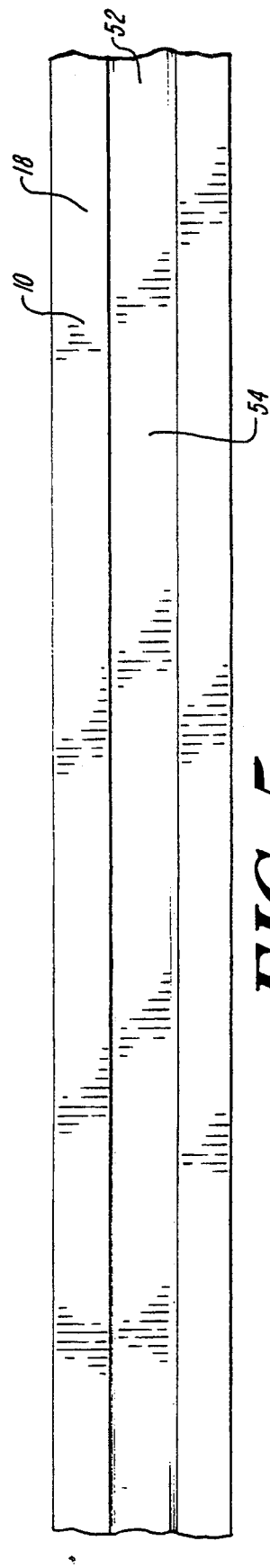
FIG. 5 is a rear elevational view.

The back wall 18 of the cartridge 10 has a recessed central portion 52 which is used when the cartridge 10 is applied to a flat surface rather than inserted in a groove (see FIG. 6A). The recessed central portion 52 creates a back groove 54 into which two-sided tape 56 with adhesive on both front 58 and back 60 surfaces can be inserted to adhere the cartridge 10 to a flat surface 62 of an existing handrail 64, for example.

Other variations of the embodiment described herein may occur to those skilled in the art, and are intended to come within the scope of the invention as described in the following claims:

What is claimed is:

1. A continuous cartridge system for applying braille messages to the inside of handrails, comprising:

a continuous length of cartridge, having a cartridge back wall and front extending overhanging portions defining a longitudinal groove, said front extending overhanging portions having edges spaced apart a distance less than the width of said back wall, to capture a braille insert therein, one or more braille inserts, bearing braille messages, each said insert comprising a longitudinal strip having front and back walls and upper and lower surfaces with edge portions spaced apart more than said edges of said front extending overhanging portions, each said braille insert inserted in said groove, a handrail, said handrail defining a handrail back wall and handrail front extending overhanging portions defining a longitudinal handrail groove, said handrail front extending overhanging portions having edges spaced apart a distance less than the width of said handrail back wall, to capture said continuous length of cartridge, said continuous length of cartridge having upper and lower surfaces with edge portions spaced apart a distance more than said edges of said handrail front extending portions, said continuous length of cartridge inserted in said handrail groove.

2. The continuous cartridge system of claim 1 wherein at least one of said braille inserts defines forward and rear tapered wall portions, tapering from said braille insert front wall to said cartridge back wall.

3. The continuous cartridge system of claim 1 wherein said continuous length of cartridge is extruded polyvinyl chloride.

4. The continuous cartridge system of claim 1 wherein said edges of said cartridge front extending overhanging portions are closely adjacent said braille insert front wall.

* * * * *